US012225010B2

(12) United States Patent
Creenaune et al.

(10) Patent No.: US 12,225,010 B2
(45) Date of Patent: Feb. 11, 2025

(54) ACCESS CONTROLS FOR A DEDICATED DATABASE SYSTEM STORING USER-GENERATED CONTENT INPUT TO A MULTITENANT SERVICE OF A COLLABORATIVE WORK ENVIRONMENT

(71) Applicants: Atlassian Pty Ltd., Sydney (AU); Atlassian Inc., San Francisco, CA (US)

(72) Inventors: Jonathon Creenaune, Sydney (AU); David Mankin, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 838 days.

(21) Appl. No.: 17/138,074

(22) Filed: Dec. 30, 2020

(65) Prior Publication Data

US 2021/0303720 A1    Sep. 30, 2021

Related U.S. Application Data

(60) Provisional application No. 63/003,103, filed on Mar. 31, 2020.

(51) Int. Cl.
*H04L 9/40*     (2022.01)
*G06F 16/245*   (2019.01)
*G06F 21/62*    (2013.01)

(52) U.S. Cl.
CPC ............ *H04L 63/10* (2013.01); *G06F 16/245* (2019.01); *G06F 21/6227* (2013.01)

(58) Field of Classification Search
CPC ... H04L 63/10; H04L 63/0428; G06F 16/245; G06F 16/2272
See application file for complete search history.

(56) References Cited

U.S. PATENT DOCUMENTS

| | | | |
|---|---|---|---|
| 8,271,574 B1* | 9/2012 | Srinivasan | G06Q 10/101 709/204 |
| 10,262,151 B2* | 4/2019 | McFerrin | H04L 63/10 |
| 10,541,983 B1* | 1/2020 | Khashei Varnamkhasti | H04L 9/085 |
| 2002/0107850 A1 | 8/2002 | Sugimoto et al. | |
| 2009/0089341 A1* | 4/2009 | Skaria | G06F 16/00 |

(Continued)

OTHER PUBLICATIONS

J.-H. Jin and M.-J. Lee, "On supporting user-defined collaborative workspaces over cloud storage," 2015 International Conference on Information and Communication Technology Convergence (ICTC), Jeju, Korea (South), 2015, pp. 1003-1008, doi: 10.1109/ICTC.2015.7354724. (Year: 2015).*

(Continued)

*Primary Examiner* — Robert B Leung
(74) *Attorney, Agent, or Firm* — Brownstein Hyatt Farber Schreck, LLP

(57) ABSTRACT

A dedicated database system for storing user-generated content created when interacting with an environment defined by a software service. An access control system provides the software service with surrogate keys only and stores an association between surrogate keys and user-generated content in the dedicated database system. Upon receiving a request for user-generated content, the software service returns a surrogate key which can be translated into associated user-generated content by the dedicated database system.

27 Claims, 6 Drawing Sheets

(56) References Cited

U.S. PATENT DOCUMENTS

| | | | |
|---|---|---|---|
| 2009/0282005 A1* | 11/2009 | Kim | G06F 16/958 |
| | | | 707/999.009 |
| 2015/0121028 A1 | 4/2015 | Gupta et al. | |
| 2015/0288760 A1* | 10/2015 | Thomas | H04L 67/55 |
| | | | 709/203 |
| 2015/0373004 A1 | 12/2015 | Hopkins et al. | |
| 2017/0302499 A1* | 10/2017 | Ding | H04L 65/00 |
| 2020/0133661 A1* | 4/2020 | Alexander | G06F 11/3684 |
| 2021/0144180 A1* | 5/2021 | Montazeri | H04L 63/102 |
| 2021/0182413 A1* | 6/2021 | Agarwal | G06F 21/6218 |

OTHER PUBLICATIONS

Author Unknown, "A Shield Platform Encryption Architecture," Salesforce, https://a.sfdcstatic.com/content/dam/www/ocms/assets/pdf/misc/Platform_Encryption_Architecture_White_Paper.pdf?bc=OTH, pp. 1-35, Jul. 17, 2015.

Yala, Louiza, "Content Delivery Networks as a Service (CDNaaS)," L'universite de Rennes, https://tel.archives-ouvertes.fr/tel-02385204/document, pp. 1-139, Jan. 1, 2018.

* cited by examiner

ACCESS CONTROLS FOR A DEDICATED DATABASE SYSTEM STORING USER-GENERATED CONTENT INPUT TO A MULTITENANT SERVICE OF A COLLABORATIVE WORK ENVIRONMENT

CROSS REFERENCE TO RELATED APPLICATION(S)

This application is a non-provisional of, and claims the benefit under 35 U.S.C. § 119 of, U.S. Provisional Patent Application No. 63/003,103 filed on Mar. 31, 2020, and entitled "Access Controls for a Dedicated Database System Storing User-Generated Content Input to a Multitenant Service of a Collaborative Work Environment," the contents of which is incorporated by reference in its entirety.

TECHNICAL FIELD

Embodiments described herein relate to multitenant services of collaborative work environments and, in particular, to systems and methods for securely storing, and/or controlling access to, user-generated content that may be input to multitenant services of collaborative work environments.

BACKGROUND

An organization can establish a collaborative work environment by self-hosting, or providing its employees with access to, one or more platforms or services to facilitate cooperation and completion of work related to common goals. For convenience and security (and in some cases, regulatory compliance), such organizations can leverage a single sign-on service to manage user and role-based permissions across multiple services in a centralized and well-controlled manner.

Such organizations, however, typically rely on each individual platform or service (or, more specifically, owners or vendors thereof) to manage access to and distribution of user-generated content input to each respective service. As a result, databases and database management systems of each individual platform or service leveraged by an organization must be regularly and separately monitored, audited, and updated in order to maintain confidence that user-generated content is not at risk of unintended disclosure, which, in turn, may result in disclosure of business intelligence and losses of competitive marketplace advantage(s).

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Figure 1:
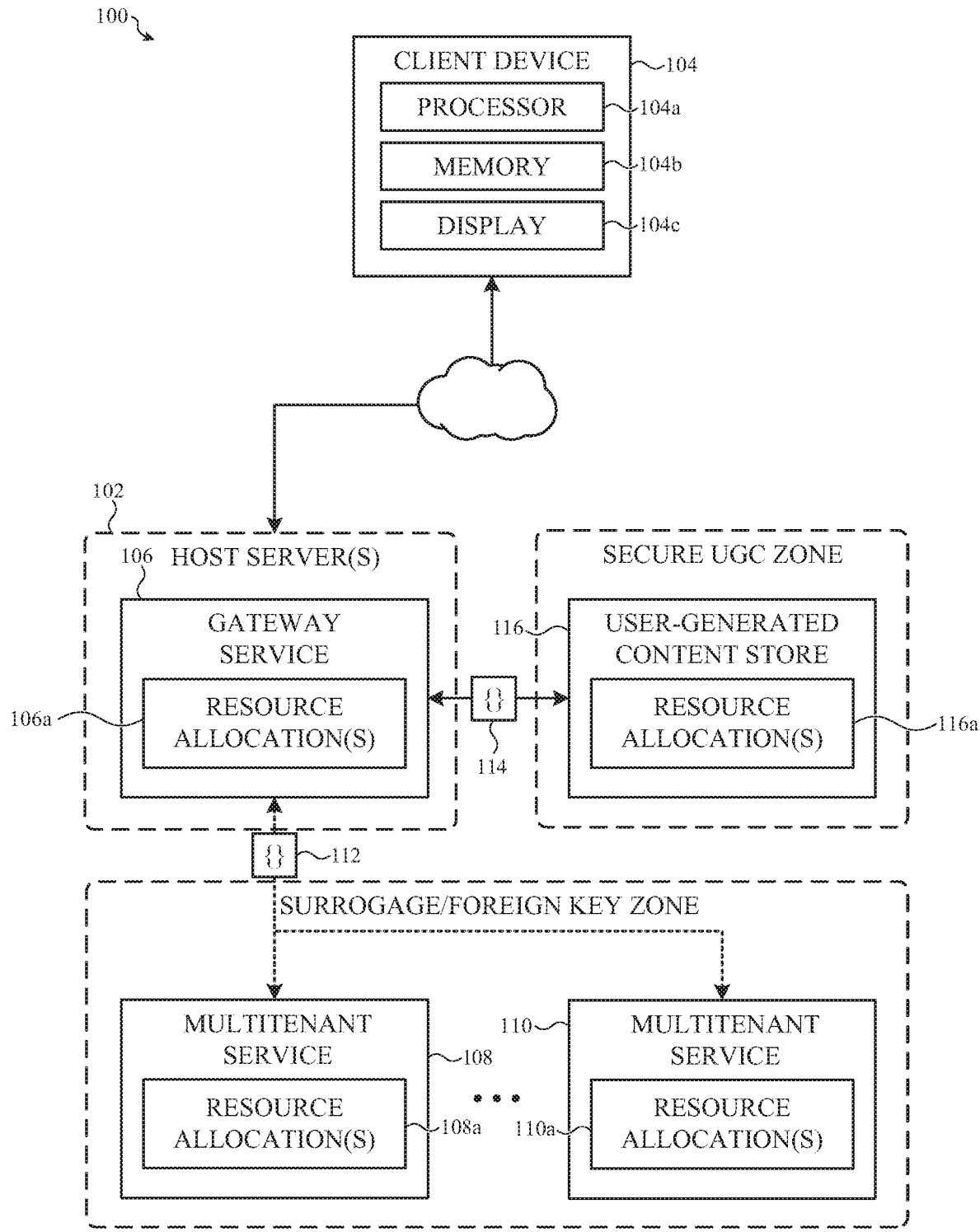
FIG. 1 depicts a simplified system diagram of a collaborative work environment leveraging a dedicated database system and an access control system, such as described herein.

Embodiments described herein relate to systems and methods for isolating and controlling access to user-generated content that may be created (and later accessed) when leveraging software as a service (herein a "software service") provided by a third-party. As used herein, the phrase "user-generated content" may be used to refer to any and all content, data, metadata, or other information regardless of form or format that is authored, developed, created, or otherwise added by, edited by, (or otherwise provided for the benefit of), a user of a software service. User-generated content can include personal data, private data, health information, personally-identifying information, business information, trade secret content, copyrighted content or information, restricted access information, research and development information, classified information, mutually-owned information (e.g., with a third party or government entity), or any other information. In many examples, although not required, user-generated content may include information that is classified in some manner, according to some procedure or protocol.

In particular, embodiments described herein reclaim control over, and access to, user-generated content from various internal databases and database management systems used by third-party software services. In these embodiments, the internal database(s) of third-party tools may be used to store foreign keys, surrogate keys, or other remote references or pointers (herein, collectively, a "surrogate key") instead of storing user-generated content directly. Embodiments described herein include a gateway service (also referred to herein as an "access control system") functioning as a type of reverse proxy, routing requests for user-generated content (e.g., from an end-user) to a specified third-party software service which, in turn, returns a surrogate key.

The gateway thereafter routes the surrogate key to a database management system defining a secure zone dedicated to storing user-generated content (herein, a "dedicated database system"). The dedicated database system receives the surrogate key and, in response, accesses an associated database and/or table (or executes a query or initiates a transaction) to retrieve user-generated content associated with that surrogate key which, in turn, can be submitted to the gateway service. Thereafter, the gateway service routes the user-generated content to the originator of the request for that user-generated content, thereby servicing the request. In this manner, the gateway service provides access control over the user-generated content.

In these examples, authentication/or and authorization operations can take place at each transaction of data between the gateway service (also referred to herein as an "access control system"), the third-party software service (referred to herein as a "software service" or, in some cases, a "multitenant software service"), and the dedicated database system. This architecture ensures, in an auditable manner, that content generated while using a third-party software service is only accessible to parties authorized by the creator(s) and/or owner(s) of that content, regardless of the quality of security controls, permissions, and/or internal database architecture(s) implemented by the third-party software service. In other words, content creators and owners, especially large-scale business entities, can have increased confidence that private/confidential business intelligence and data is not at risk of inadvertent disclosure by a third-party software service provider (e.g., through an authentication implementation error, a leaky API, user/role management errors, and the like).

Embodiments described herein may be particularly useful to an organization self-hosting, or providing its employees with access to, a number of different platforms and/or software services to establish a collaborative, cooperative and efficient work environment. Herein, such software services can be referred to as "collaboration tools" or "collaboration services." Example collaboration services such as described herein can include but may not be limited to: messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular collaboration service, can be considered user-generated, content as described herein.

One example of a collaboration service/software service, as described herein, is a project management system or tool that can be implemented in whole or in part as an instance or tenant of an instance of software executed by a container, a virtual server, or a physical server (or other computing appliance or combination of appliances) that provides a team of individuals with a means for communicating and exchanging information with one another. All information exchanged through and/or added to a project management system or tool can be considered user-generated content, as described herein.

In some examples, a collaboration service can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). Each data item associated with each above-described function can be considered user-generated content, as described herein.

In other cases, a collaboration service can be configured for non-software related purposes, such as for use by a human resources team, an information technology support group, and so on. As with other examples introduced above, any configuration or addition of information to any collaboration service described herein can be considered user-generated content, as described herein.

In view of the foregoing it may be appreciated that generally and broadly a collaboration service, such as described herein, can be used to (1) facilitate exchange any quantity of user-generated content including files, text content, or information, (2) facilitate text, audio, or video communication, or (2) to facilitate any other suitable collaboration or communication purpose. In this manner, a collaboration service increases efficiency of a team of individuals working on a common goal or project by increasing the speed by which information can be shared between team members, between supervisors and subordinates, and between management and staff.

To perform these functions, a collaboration service, however configured or used by a team of individuals or an organization, can implement a client-server architecture in which a host server or service associated with the collaboration service receives requests from and provides responses to (some or all of which may comply with a communication protocol such as HTTP, TCP, UDP, and the like) one or more client devices, each of which may be operated by a user of the collaboration service. In other cases, a request-response architecture may not be required and other communication and information transaction techniques may be used. For simplicity of description, examples that follow reference a request-response architecture, but it may be appreciated that different collaboration services may be configured to serve and/or host information, including user-generated content, in a number of suitable ways.

In these examples, more specifically, a host server supporting one or more functions of a collaboration service such as described herein can serve information, including user-generated content, to a client device and, in response, the client device can render a graphical user interface on a display to present at least a portion of that user-generated content to a user of that client device.

For example, a collaboration service can serve an informational page for each project tracked by the collaboration service that provides contact information for a team of individuals responsible for working on that respective project. In another example, a collaboration service can host a page associated with a human resources department of an organization that provides a quick reference to a number of facts about that organization, such as the number or address of various offices, the names of executives, salary ranges for different positions, and so on.

However, as noted above, conventional collaboration services all maintain at least one internal database that is typically configured to store user-generated content. In this manner, when a client device submits a request for user-generated content to a host server supporting the collaboration service, the collaboration service accesses the internal database to retrieve one or more items of user-generated content responsive to the request.

As noted above, this conventional construction delegates access to and control of user-generated content to each individual collaboration service. This presents a defined risk that user-generated content can be unintentionally disclosed to (or maliciously obtained by) third parties, thereby leaking confidential business information and potentially exposing business intelligence to competitors.

To account for these and other disadvantages of conventional user-generated content storage techniques, embodiments described herein leverage a gateway service, such as described above. In particular, a gateway service as described herein can receive a request from a client device to access certain user-generated content stored by a particular collaboration service. In many cases, such a requests may take the form of a computer-readable API request. The gateway service receives the request, and routes the request to the relevant collaboration service which response with one or more surrogate keys. The surrogate keys may be Globally-unique Identifiers ("GUIDs"), Universally-unique identifiers ("UUIDs"), an integer or any other suitable pointer or reference data item. The surrogate keys are typically not sequential (e.g., randomly distributed according to a particular distribution), but this may not be required of all embodiments. The gateway service receives the surrogate key from the collaboration service and routes the surrogate key to a secure zone defined by a dedicated database system, such as described above. The dedicated database system executes a query or transaction associated with the surrogate key and returns user-generated content to the gateway service which, in turn, returns the user-generated content to the client device that made the original request. As noted above, each of these services may be communicably coupled in a secure manner, such as over TLS or a similar point-to-point encryption protocol. In addition, in some examples, authentication and/or authorization operations may be performed as each transaction of data between each service and device (e.g., the gateway service, the collaboration service, the dedicated database system, and the client device) is initiated and/or otherwise carried out.

As a result of these constructions, an organization (or company providing access to software as a service) implementing systems as described herein can leverage a number of benefits such as, but not limited to: user/role permissioning specific to particular user-generated content; an organization-wide kill-switch for access to user-generated content; a single point of control for user/role permissions for disabling or enabling individual users or groups access to multiple discrete software services (which may or may not be provided by the same third or first party provider); and so on. These advantages are not exhaustive; a person of skill in the art may readily appreciate a system as described herein may substantially improve security of systems storing user-generated content.

For example, in many embodiments, systems described herein can be used to substantially increase security by enabling licensees of software and/or tenants of software services to choose their own encryption protocols or standards, without relying on implementation of those chosen protocols or standards by third-parties. Conventionally, an architecture of this type is referred to as a "bring-your-own-key" architecture in which a tenant of a software service (or a licensee of software) supplies and manages control over their own encryption keys (whether private and/or public). For certain embodiments described herein, organizations can bring their own key, allowing those key holder organizations to revoke or grant access to user-generated content without involving any third-party, such as a vendor of a software service leveraged by that organization.

In further examples, embodiments described herein can be leveraged by software service vendors to improve security and/or regulatory compliance of their own product offerings. In particular, a software service vendor may leverage systems and methods described herein by removing user-generated content to a dedicated database system gated by a gateway service (such as described herein), thereby repurposing internal databases of software services for storing only (or substantially only) surrogate keys as described herein. In these architectures, a vendor of a software service may be able to more easily comply with regulations or laws regarding user data storage locations, personally-identifying data storage locations, protected health information storage locations and/or security protocols, identity information storage locations and/or security protocols, and/or other information related to users, business, or otherwise.

In still further examples, architectures described herein permit an organization to self-host their own data or content. In these examples, an organization's own data can be stored on the organizations servers which, in turn, can be communicably coupled to a gateway service either under the control of the organization or under the control of a vendor.

It may be appreciated that the foregoing examples are not exhaustive; a dedicated database system as described herein can be leveraged in number of ways to provide a number of short-term and long-term security and data/control benefits.

For example, in some cases, a dedicated database system can be configured to store user-generated content of different types in different ways and/or with different permissions. For example, user-generated binary large objects (e.g., a multimedia object) may be stored in a different database or table than user-generated text objects. It may be appreciated by a person of skill in the art that certain database schemas or structures may more efficiently operate to store large objects or relatively small objects; optimization of database type or schema type may be readily implemented if leveraging a dedicated database system, such as described herein.

In other examples, different data types may be stored in different databases having different permissions. For example, an organization may desire to define different access permissions for different types of data. As one example, a novice user of a project management tool may be permissioned to view all text content of a documentation service, but may not be permissioned to view multimedia content, such as images of schematics or photographs of prototypes. As another example, a senior user of a documentation service may opt to hide multimedia content (that may be unnecessary or redundant for the senior user) such that requests to the documentation service process faster, returning only text content. As yet another example, an organization may permit users to view only a portion (e.g., one row) of a spreadsheet that corresponds with their position or company rank, such as a salary spreadsheet. These examples, more generally and broadly, illustrate that an organization leveraging systems and methods described herein can create and manage user permissions and access controls not only for particular pages or for particular software services, but for any suitable portion or subportion thereof. As one example, an organization may opt to define that a certain user or set of users is not permissioned to view any URLs, URIs, or other links. In this example, any page or portion of user-generated content requested by the certain user or set of users may be presented without any links of any kind. In another example, an organization may opt to define that a certain user or set of users is not permissioned to view, without limitation: metadata; user identity data; user data associated with a particular project, page, repository, spreadsheet, webpage, and so on; multimedia files, such as audio recordings, security camera footage, prototype photographs or schematics, building plans, and so on; financial reports; certain input buttons or fields presented in a graphical user interface; real names (as compared to usernames or aliases); and so on. It may be appreciated by a person of skill in the art that an organization can opt to define any number of suitable user, role, or group-specific access restrictions to user-generated content, as described herein. In some cases, such access restrictions may be compliant with a regulatory framework, such as the General Data Protection Regulation.

Embodiments described herein also reference systems and methods for indexing content stored in a dedicated database system, as described herein, to service search requests. In particular, in these embodiments, an indexing service (also referred to as a "search service") can be configured to operate in a number of suitable ways. For example, the indexing service may be configured to perform one or more preprocessing, segmentation, and/or other preparatory task over the user-generated content in preparation for indexing into one or more search indices. Examples include, but are not limited to: splitting of text into words and/or n-grams; normalizing case; removing or altering punctuation; removing or altering diacritical marks; translation to or from one or more languages; lemmatization of text; reversing of text; Levenshtein distance calculations; phonetic tokenization operations; de-compounding compound words; expanding contractions; hashing or normalizing numerical values; calculating histograms or histogram fingerprints of image or video files; calculating acoustic fingerprint(s) of an audio file; and so on. The preceding examples are not exhaustive; any suitable preprocessing method or task may be performed by an indexing service of a dedicated database system, such as described herein. In further examples, new user-generated content may be used to update one or more of a Bloom filter (permitting false positives), a direct-mapped cache (permitting false negatives), and/or a lossy hash table (permitting false negatives) prior to being stored in a data store of the associated dedicated database system. Such filters may be useful in certain implementations to quickly return an indication of whether further search operations are necessary. These example indexing and pre-indexing operations are not exhaustive; in other embodiments other operations and/or additional operations may be performed to index user-generated content stored in a dedicated database system, such as described herein.

In further embodiments, an organization may additionally or alternatively leverage a global search service or global indexing service that indexes user-generated content regardless of the particular software service that user-generated content is associated with. For example, an organization may use a messaging service and, separately, a project management service. In such an example, the global search service (which is a portion of a dedicated database system storing user-generated content associated with, and generated while using, the messaging service and the project management service) can be leveraged by the organization to search both the messaging service and the project management service simultaneously. In these examples, more generally and broadly, as a result of storing all of an organization's user-generated content in a single location (e.g., a dedicated database system, such as described herein), a global index can be created that supports an organization-wide search to be performed without requiring hooks into (and associated maintenance of), or relying exclusively upon comprehensiveness of results return from, an API provided by any particular software service leveraged by the organization.

In view of these foregoing examples, it may be appreciated that generally and broadly, a system such as described herein (1) removes user-generated content from internal databases of software services to a dedicated database system, (2) repurposes the internal databases of the software services to store surrogate keys (such as UUIDs or GUIDs), and (3) leverages a gateway service to route requests for user-generated content to the software services and the dedicated database system to translate surrogate keys into user-generated content. This architecture provides many benefits, as described above, but in particular, the architecture substantially reduces a possibility that user-generated content belonging to an organization is inadvertently disclosed due to an error introduced by a vendor of a software service of which the organization is a licensee or tenant.

For example, an Organization may be a tenant of a multitenant Project Management Service provided, hosted, and/or managed by a Vendor. If leveraging conventional systems and techniques, the Organization in this example depends on the Vendor for (1) user/role management for the Project Management Service and (2) for storage and retrieval of user-generated content, such information related to a Set of R&D Projects undertaken by the Organization.

At an unknown/unknowable time, the Vendor may inadvertently introduce an SQL injection attack vector by not sanitizing inputs to the user-generated content database. A malicious actor (e.g., hacker, nation state, business competitor, and so on) may discover the vulnerability and may begin ex-filtrating user-generated content stored by the Project Management Service, such as information related to the Set of R&D Projects. It may be appreciated by a person of skill in the art that unintended disclosure of the Set of R&D Projects, and information pertaining thereto, presents a substantial—potentially existential risk—to the market competitiveness of the Organization.

By contrast, if leveraging systems and methods described herein, user-generated content is not stored by the Vendor because the Vendor stores surrogate keys in the database that, conventionally, stores user-generated content. As a result of this architecture, inadvertent, negligent, or intentional errors committed by the Vendor do not result in disclosure or exfiltration of any actual information related to the Set of R&D Projects; in this example, only surrogate keys may be obtained from the Vendor's internal database. Surrogate keys, like other arbitrary identifiers or cryptographic tokens are inherently useless—and do not convey any particular information.

These foregoing and other embodiments are discussed below with reference to FIGS. 1-6 However, those skilled in the art will readily appreciate that the detailed description given herein with respect to these figures is for explanation only and should not be construed as limiting.

FIG. 1 depicts a simplified system diagram of a collaborative work environment 100 leveraging a dedicated database system and an access control system, such as described herein. For simplicity of illustration, the embodiments that follow reference an example construction in which an organization is a tenant of multiple discrete multitenant services that can be leveraged by employees of the organization to advance a common goal.

It may be appreciated that multitenant services are (e.g., platform as a service, software as a service, data as a service, and so on) are merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how data management techniques described herein can be equivalently applied to many software systems and data architectures, examples that follow reference only multitenant system architectures (i.e., systems leveraging one or more multitenant services for collaboration purposes) for simplicity of description.

Example multitenant services that may include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 100—which is merely one example of an architecture such as described herein—includes a host server 102 that communicably couples via one or more networking or wired or wireless communication protocols to a client device 104. It may be appreciated that other client devices may be configured in a substantially similar manner as the client device 104, although this may not be required of all embodiments and different client devices can be configured differently and/or may transact data or information with, and/or provide input(s) to, the host server 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute one or more software applications (each referred to as "client applications") stored, at least in part, in the memory 104b. Each respective client application can be instantiated by the processor 104a. In particular, the processor 104a may access a persistent memory (e.g., of the memory 104b) to retrieve one or more executable binary files and/or other computer-executable instructions (collectively, "assets"). The processor 104a thereafter can load at least a portion of the retrieved assets into a working memory (e.g., of the memory 104b), thereby at least partially instantiating the respective client application. For simplicity of description an implementation in which the client device 104 is configured to execute/instantiate a single client application is described below.

In embodiments, the host server 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host server 102 may be a cluster of different computing resources, which may be geographically separated from one another. In this manner, generally and broadly, both the host server 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host server 102 and the client application supported/executed by the client device 104 are communicably coupled via a suitable network connection which may be wired, wireless, or a combination thereof. In some examples, the network connection may include the open Internet.

In other cases, the network connection coupling the host server 102 and the client application may include only a private intranet managed by, or otherwise utilized by, an organization such as referenced above. The host server 102 and the client application can communicate according to any suitable protocol, form, or format. In many examples, the host server 102 at least partially exposes an API that can be accessed by the client application to perform one or more functions. For example, the client application may leverage the API to request user-generated content (such as described herein) from the host server 102.

For simplicity of description, the embodiments that follow reference a configuration in which the host server 102 and the client application are configured to communicate and transact information according to a REST API, but it may be appreciated that this is merely one example and in other embodiments other signaling, communication, or data transaction methodologies may be used.

The host server 102 of the collaborative work environment 100 can be configured and/or implemented in a number of suitable ways. For example, in many embodiments the host server 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host server 102, such as a gateway service 106.

The gateway service 106 can be hosted by a virtual machine or container executing over physical or virtual resources of the host server 102; collectively the physical and/or virtual resources allocated to instantiate the gateway service 106 are identified in the figure as the resource allocation(s) 106a. As with other embodiments described herein, the resource allocation(s) 106a can include, but may not be limited to (or may not require) one or more of: a processor; a memory; non-volatile storage; networking connections; and the like.

For example, in many constructions, the gateway service 106 is implemented in whole or in part as a software instance. The software instance defining the gateway service 106 may be instantiated by a processor among the resource allocation(s) 106a. In particular, the processor may access a persistent memory to retrieve executable binary files and/or other computer-executable instructions (collectively, "assets"). The processor thereafter can load at least a portion of the retrieved assets into a working memory, thereby at least partially instantiating the gateway service 106.

In some embodiments, the gateway service 106 may be provided as a serverless function (e.g., a lambda function), may be provided as a reverse proxy, may be provided as a router or as any suitable software and/or hardware appliance configurable to communicably couple at least to the client device 104 and to service requests for information therefrom, such as requests for user-generated content such as described herein.

In other implementations, although not illustrated, the gateway service 106 may be executed/instantiated separately from the host server 102 altogether.

As noted with respect to other embodiments described herein, the gateway service 106 can be configured to receive requests and serve responses specifically related to user-generated content created within an environment defined at least in part by a multitenant software service.

For example, an example multitenant service is a messaging service. In this example, user-generated content may be a message log attributed to or otherwise associated with a particular user of the messaging service. At some instant, the user may operate the client device 104 to initiate a request intended to be received by the messaging service to retrieve the message log. In this example, the gateway service 106 interposes the messaging service and the client application, routing the request for user-generated content originating from the client application to the messaging service.

In another example, a multitenant service may be a project management service. In this example, user-generated content may be a set of documentation detailing one or more projects attributed to or otherwise associated with a particular user of the project management service. At some instant, the user may operate a graphical user interface rendered on the display 104c by the client application to initiate a request intended to be received by the project management service to retrieve the set of documentation detailing a selected project. In this example, as with others described herein, the gateway service 106 interposes the project management service and the client application, routing the request for user-generated content originating from the client application to the project management service.

In further examples, as described above, a single collaborative work environment, such as the collaborative work environment 100, may leverage a number of discrete services which may or may not be supplied by the same vendor.

For example, an organization may be a tenant of a messaging service, a project management service, an issue tracking service, a directory service, an email service, a telephony service, and a code repository service—each of which may define an environment in which a user of that service can create and consume user-generated content.

In these examples, the client application may be operated at some instant by a user to obtain a message from the messaging service, obtain information about a project form the project management service, add an issue to the issue tracking service, obtain contact details for a colleague leveraging the directory service, send an email to that colleague via the email service, receive a voice message from that colleague via the telephony service, and submit a pull request to the code repository service.

In these examples, as may be appreciated, the gateway service 106 can be configured to route each respective request from the client application to each appropriate intended recipient/endpoint service. In particular, user-generated content requests related to messaging are routed to the messaging service, user-generated content requests related to email are routed to the email service, user-generated content requests related to telephony are directed to the telephony service, and so on.

More generally, the user in this example may operate the client application to obtain or to generate user-generated content with the assistance of, or within an environment defined at least in part by, a respective one service of which the organization is a tenant. For example, a project management service may be associated with a project management client application. The user can use the project management application to access the project management service which, in turn, defines an environment in which the user can use the client application to generate user-generated content related to, and relevant for, project management purposes. In another example, an issue tracking service may be associated with an issue tracking client application. The user can use the issue tracking application to access the issue tracking service which, in turn, defines an environment in which the user can use the client application to create or consume user-generated content related to, and relevant for, issue tracking purposes.

In view of the foregoing examples, it may be appreciated that, generally and broadly, the client application executed/instantiated by the client device 104 may be purpose configured to communicate with a particular multitenant service. More specifically, the client application may be configured to communicate with the multitenant service according to a particular API defined by that multitenant service. In the illustrated example, two example multitenant services are illustrated with which the client application(s) instantiated by the client device 104 may communicate. A first multitenant service is identified as the multitenant service 108 and a second multitenant service is identified as the multitenant service 110.

As with other computing resources described herein, the multitenant service 108 and the multitenant service 110 can be hosted by a virtual machine or container executing over physical or virtual resources; collectively the physical and/or virtual resources allocated to instantiate the multitenant service 108 and the multitenant service 110 are identified in the figure as the resource allocation(s) 108a, 110a, respectively. The resource allocation(s) 108a, 110a can include, but may not be limited to (or may not require) one or more of: a processor; a memory; non-volatile storage; networking connections; and the like For example, in many constructions, each of the multitenant service 108 and the multitenant service 110 is implemented in whole or in part as a software instance of which the organization is a tenant. Each respective software instance defining each of the multitenant service 108 and the multitenant service 110 may be instantiated by a processor allocation. In particular, the processor allocation may access a persistent memory to retrieve one or more assets. The processor thereafter can load at least a portion of the retrieved assets into a working memory, thereby at least partially instantiating the multitenant service 108 and the multitenant service 110.

In these examples, the gateway service 106 of the host server 102 can be configured to route requests (herein "API requests") from one or more client applications executing on the client device 104 (conforming to endpoint-specific APIs) to either of the multitenant service 108 and the multitenant service 110. In some cases, the gateway service 106 is configured as a pass-through, whereas in others, the gateway service 106 may be configured to modify requests submitted from client applications and intended to be received by multitenant applications. The gateway service 106 can identify and/or predict an appropriate endpoint using any suitable method including, but not limited to: request format; request content; request header tags; domains, subdomains, or URLs to which the request is directed; and so on. It may be appreciated that these foregoing examples are not exhaustive of the ways by which the gateway service 106 may route signals and/or may make determinations in advance of, or otherwise to inform, routing signals to various multitenant services.

In the illustrated embodiment, an example API request 112 is routed by the gateway service 106 to one of the multitenant service 108, 110.

Once the API request 112 is routed by the gateway service 106 to a particular endpoint multitenant service (such as one of the multitenant service 108 or the multitenant service 110), the gateway service 106 may thereafter receive, from that service, at least one surrogate key. The surrogate key(s), as noted above, may be a UUID, a GUID, a cryptographic token, an index, or any other suitable data item.

After receiving the surrogate key, the gateway service 106 routs the surrogate key(s), illustrated as the surrogate key API response 114, to a dedicated database system identified in the figure as the user-generated content store 116. As with other computing resources described herein, the user-generated content store 116 can be hosted by a virtual machine or container executing over physical or virtual resources; collectively the physical and/or virtual resources allocated to instantiate the user-generated content store 116 are identified in the figure as the resource allocation(s) 116*a*. The resource allocation(s) 116*a* can include, but may not be limited to (or may not require) one or more of: a processor; a memory; non-volatile storage; networking connections; and the like.

The user-generated content store 116 receives the surrogate key API response 114 and queries and/or assembles a transaction to execute against one or more databases associated with the multitenant service to which the API request 112 was sent. Results from this query contain user-generated content responsive to the original API request 112. The retrieved user-generated content associated with the surrogate keys referenced in the surrogate key API response 114 are thereafter transmitted from the user-generated content store 116 to the gateway service 106 which, in turn, can return the user-generated content to the client application of the client device 104. In many examples, additional encryption/decryption steps or operations may be performed to enhance security of data stored in the user-generated content store 116.

As a result of this construction, the host server 102 and in particular the gateway service 106 defines separate information secure zones across the boundaries of which only certain types of information can flow. In particular, as shown in the illustrated embodiment, a first secure zone identified as the surrogate key/foreign key zone encompasses each multitenant service. In this zone, user-generated content is not stored; only surrogate keys are stored. The host server 102 and, more specifically, the gateway service 106 can operate to ensure that no user-generated content is transmitted into the surrogate key/foreign key zone. In some examples, the gateway service 106 can include one or more subservices, such as checkpoint subservices or queues (not shown) that specifically govern and enforce what types of data can cross the surrogate key/foreign key zone boundary. In an event that the gateway service 106 and/or a checkpoint subservice determines that disallowed content (e.g., user-generated content) is requested to cross the surrogate key/foreign key zone boundary, that request may be denied or refused thereby preventing user-generated content from ever reaching either of the multitenant services 108, 110.

In addition, the host server 102 defines a second security boundary identified as the user-generated content zone. The user-generated content zone encompasses the user-generated content store. In this zone, user-generated content is stored and associated with (e.g., via association tables or another suitable data structure) unique surrogate keys are stored.

As with the surrogate key/foreign key zone, the host server 102 and, more specifically, the gateway service 106 can operate to ensure that no user-generated content exits the user-generated content zone except when directed to an authorized client application executing on an authorized client device, such as the client device 104.

As described above, the gateway service 106 and/or the user-generated content store 116 can include one or more subservices, such as checkpoint subservices or queues (not shown) that specifically govern and enforce what types of data can cross the user-generated content zone boundary. In an event that the gateway service 106 and/or a checkpoint subservice determines that a disallowed content request has occurred, that request may be denied or refused thereby preventing user-generated content from crossing the user-generated content zone boundary.

The foregoing described architecture provides a number of security advantages and end-user and organization benefits. For example, as a result of this architecture, presence and operation of the gateway service 106 is entirely transparent to the client device 104 and, importantly, to a user of the client device. In other words, any request(s) made by the client device 104 appear to the client device 104 as being fully serviced by the targeted endpoint multitenant service. In this manner, embodiments described herein can be implemented as drop-in security improvements to existing architecture.

For example, a user of the client device 104 may desire to access a particular page of a documentation service. To retrieve and consume this content, the user may launch a client application associated with or otherwise configured to access the documentation service (which may be the multitenant service 108).

Once launched, the user may instruct the client application to render or otherwise access the desired page. To service this request, the client applications assembles an API request intended for the documentation service. In one embodiment, the API request may be formatted as a JSON request, such as "{page_id: 012345}."

In conventional systems, the API request may be submitted directly to the documentation service which in turn returns the requested user-generated content, which may be a JSON response such as "{title: 'test', content:'test content here' }." Continuing the conventional example, the client application may receive the JSON response and therewith render a page showing a title with content "test" and content of "test content here." It may be appreciated that both the title and the content may be considered user-generated content as described herein.

In contrast to conventional implementations, for systems described herein, the API request originating from the client application may be submitted to the gateway service 106, which interposes the client application (executing on the client device 104) and the documentation service.

In this example leveraging systems and embodiments described herein, the gateway service 106 routes the JSON request to the documentation service which, in turn, returns a JSON response containing only surrogate keys such as "{title: '00aa22bb-33cc-44dd-55ee-001122334455', content: '0000aaaa-1111-2222-3333-00001111' }." The gateway service 106 thereafter forwards these surrogate keys to the user-generated content store 116 within the user-generated content zone. The user-generated content store 116 can associate the first surrogate key of 00aa22bb-33cc-44dd-55ee-001122334455 with the user-generate content "test" and the second surrogate key with the user-generated content "test content here." Therewith, the user-generated content store 116 can assemble a response substituting surrogate keys with user-generated content to generate a JSON response identical to the conventional example above, "{title: 'test', content:'test content here' }." In turn, this "populated" JSON response can be returned to the client application, via the gateway service 106.

These foregoing embodiments depicted in FIG. 1 and the various alternatives thereof and variations thereto are presented, generally, for purposes of explanation, and to facilitate an understanding of various configurations and constructions of a dedicated database system and an access control system (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in view of the foregoing examples, embodiments described herein generally and broadly include a gateway service/access control system that serves to translate a surrogate key stored in an internal database of a multitenant service by routing that surrogate key to a secure zone encompassing a user-generated content store. The user-generated content store can retrieve user-generated content associated with the surrogate key and return that user-generated content to the gateway service. The gateway service and/or the user-generated content store can be configured to emulate API responses of the multitenant service. In this manner, a client application or client device that communicably couples to the gateway service receives responses to any API request it sends in a format that device/application expects.

As noted above, the gateway service and/or the user-generated content store can be configured to replace surrogate keys present in a surrogate key API response received from the multitenant service, but this may not be required; API responses may be created by the gateway service and/or the user-generated content store on demand. In this manner, generally and broadly, it may be appreciated that the user-generated content store substantially emulates the request-response behavior and storage schema(s) of the multitenant service. In a broad sense, embodiments described herein remove user-generated content storage from a multitenant software product, leaving application logic to be handled by the multitenant software.

Also as noted above, the gateway service (the "access control system") and/or the user-generated content store (the "dedicated database system") can be configured to perform searching and/or indexing functions. In these examples, an API request from a client application to search user-generated content may be routed by the access control system to the multitenant service which, in turn may return a surrogate key identifying a search database, a search parameter or option set, or any other suitable option. In such examples, the multitenant service may also return to the access control system one or more query strings or transactions submitted with the original request. In this example, the access control system can rout the surrogate keys and query strings to the dedicated database system which, in turn, may execute the query and return results to the client application via the access control system.

In still further embodiments, content created within an environment defined by the multitenant service may be redirected by the access control system to the dedicated database system. For example, the access control system may be configured to monitor for certain API calls (associated with generating or saving user-generated content) from a client device to the multitenant service. Once such calls are intercepted, the access control system can route the call to the dedicated database system which, in turn can store the data according to the API call and can return to the access control system one or more surrogate keys. These surrogate keys can be used to generate an API call to the multitenant service, thereby causing the multitenant service to leverage its own internal database and table structure to store surrogate keys that, at a later time, can be used to retrieve the original user-generated content. In these embodiments and others, the multitenant service and the dedicated database system are communicably decoupled; the access control system facilitates all communications between the multitenant service and the dedicated database system.

In some examples, surrogate keys may be typed in a selected manner so that the keys can be stored without issue in the original database structure of the multitenant service. For example, if the multitenant service expects a particular column to be a date, a unique surrogate key that is also compliant with Epoch date/timestamp format may be generated. As one example, a surrogate key can comply with Epoch timestamp format, such as "−1629738000000." In this example, the multitenant service considers the surrogate key value as a valid date whereas the access control system considers the surrogate key to be just that, a surrogate key pointing to some user-generated content.

In another example, a multitenant service may expect a particular column to be a binary large object. In this example, a unique surrogate key can be generated as a string (e.g., UUID or GUID) and binarized prior to storing in the multitenant service database.

It may be appreciated that these foregoing example are not exhaustive of all possible forms or formats of that a surrogate key such as described herein make take. Further it may be appreciated that the foregoing examples are not exhaustive of all means by which data or content may be added to a dedicated database system by leveraging an access control system, such as described herein. As such, to facilitate an understanding of a system as described herein from a broad and general sense, FIG. 2 is provided.

Figure 2:
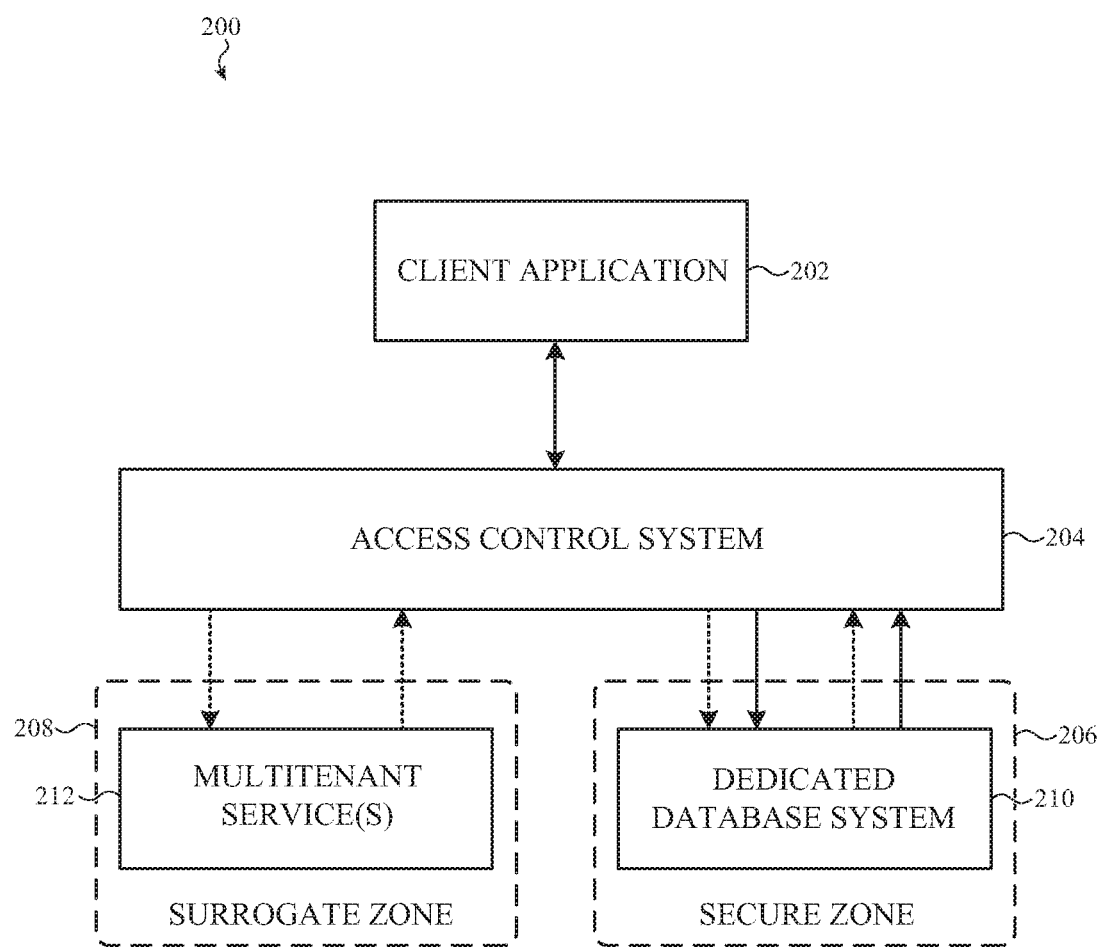
FIG. 2 depicts a simplified system diagram of a dedicated database system managed by an access control system, such as described herein.

In particular, FIG. 2 depicts a simplified system diagram of a dedicated database system managed by an access control system, such as described herein. The system 200 services requests from a client device that may be configured to execute one or more instances of one or more client applications, such as described above. The client device may be configured as described above with reference to the client device 104 of FIG. 1; this description is not repeated.

A client application instance (more simply, the "client application") executing on the client device 202 may be a native application, a browser application pointing to a particular address, or may any other suitable application or application or function wrapper. In the illustrated embodiment, the client application is identified as the client application 202. Regardless of the specific implementation of the client application 202, it is configured to communicably couple to a multitenant service. As one example, the client application 202 may be a local code repository management application and the multitenant service may be a code repository service.

As with other embodiments described herein, the client application 202 is communicably coupled to an access control system 204; the client application 202 is not directly communicably coupled (in many implementations; not a requirement of all embodiments) with the multitenant service. In other words, the access control system 204 interposes the client application 202 on the client device and the multitenant service. This separation provides an additional layer of security mitigating risks of inadvertent disclosure of user-generated content.

The access control system 204 defines two separate information security or data secure zones. A first zone (identified as the secure zone 206) encompasses user-generated content or other private data and a second zone (identified as the surrogate zone 208) encompasses other data, such as surrogate keys as described herein. More specifically, a dedicated database system 210 is within the secure zone 206 and the multitenant service (identified as the multitenant service 212) is within the surrogate zone 208.

As a result of this construction/definition, user-generated content (identified by solid lines) can only flow between the client application 202 and the dedicated database system 210 via the access control system 204. Phrased in another manner, user-generated content can only flow out of the secure zone 206 if directed to the client application 202.

Similarly, surrogate keys (identified by dotted lines) are defined to only flow between the multitenant service 212, the access control system 204, and the dedicated database system 210. As a result of this architecture, user-generated content is protected from inadvertent disclosure by a vendor, host, or maintainer of the multitenant service.

These foregoing embodiments depicted in FIGS. 1-2 and the various alternatives thereof and variations thereto are presented, generally, for purposes of explanation, and to facilitate an understanding of various configurations and constructions of a dedicated database system and an access control system (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
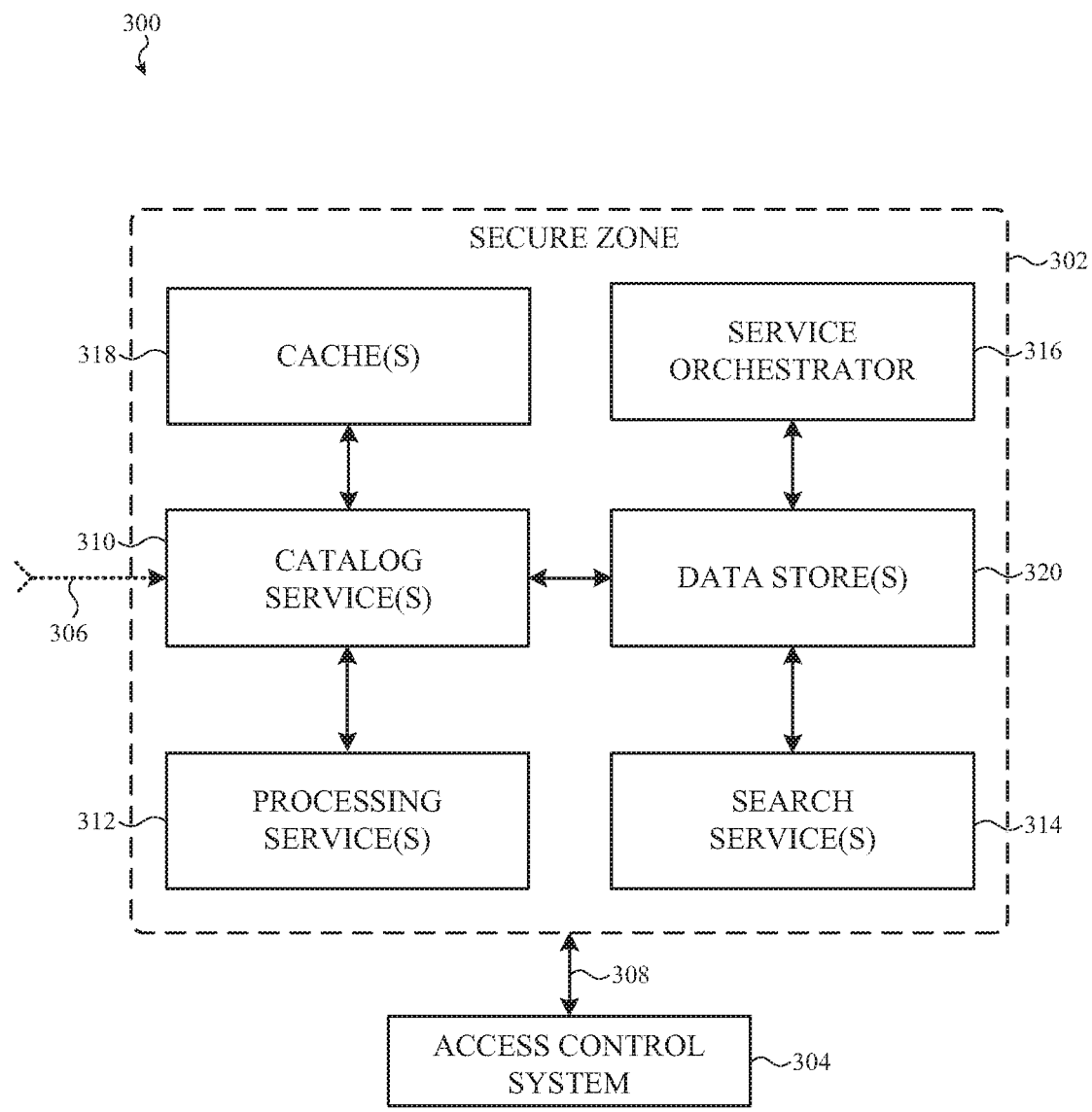
FIG. 3 depicts a simplified diagram illustrating a secure zone defined by a dedicated database system and configured to compartmentalize user-generated content, such as described herein.

FIG. 3 depicts a simplified diagram illustrating a secure zone defined by a dedicated database system and configured to compartmentalize user-generated content, such as described herein. The system 300 defines a secure zone 302, such as described above. The secure zone 302 can be defined, at least in part, by an access control system 304.

The secure zone 302 is configured to receive as an input 306 a surrogate key (shown as a dotted line). The surrogate key can be received from the access control system 304 or may be received from a multitenant service, such as described herein. In certain examples the surrogate key can be received from a client device or client application such as described herein. As noted with respect to other embodiments, the secure zone 302 may be configured to output user-generated content 308; the output may be provided only to the access control system 304 which, in turn, may route the user-generated content 308 to a client application or client device, such as described herein.

The surrogate key may be received at a catalog service 310. The catalog service 310 is encompassed by the secure zone 302 in that no data output from the catalog service 310 crosses a boundary of the secure zone 302. The catalog service 310 within the secure zone 302 is configured to translate the surrogate key into a query and/or transaction that can return an associated data item of user-generated content. The catalog service 310 may also be configured to generate one or more surrogate keys to associate with new user-generated content, such as described above.

The system 300 also can include a data processing service 312. The data processing service 312 may be configured to preform one or more operations on user-generated content provided to the system 300 as input via the access control system 304. Examples include but are not limited to: input sanitization; stripping disallowed content or media tags; resizing or reformatting multimedia files; and so on. It may be appreciated that these examples are not exhaustive of the various data manipulations or operations that may be performed prior to storing user-generated content or, alternatively, prior to serving user-generated content to a client application via the access control system 304.

The system 300 can also include a search service 314 configured to manage and/or maintain one or more indexes to support search functions against data stored in the dedicated database system. As noted with respect to other embodiments described herein, an index purposed for search can be established and maintained in a number of suitable ways. Examples operations attendant to maintaining an index include, but are not limited to: splitting of text into words and/or n-grams; normalizing case; removing or altering punctuation; removing or altering diacritical marks; translation to or from one or more languages; lemmatization of text; reversing of text; Levenshtein distance calculations; phonetic tokenization operations; de-compounding compound words; expanding contractions; hashing or normalizing numerical values; calculating histograms or histogram fingerprints of image or video files; calculating acoustic fingerprint(s) of an audio file; and so on. The preceding examples are not exhaustive; any suitable operation, method, or task may be performed by an indexing service of a dedicated database system, such as described herein.

The system 300 can also include a service orchestrator 316 tasked with deploying and monitoring one or more services, subservices, or microservices associated with an operation of the system 300. For example, the service orchestrator 316 can be configured to monitor and log behaviors and actions of the search service 314, the processing service 312, and/or the catalog service 310.

The system 300 can also include one or more request caches, identified in the illustration as the cache(s) 318 that may be leveraged (e.g., by the catalog service 310) to improve performance of the system 300.

The system 300 can also include one or more data stores 320 specifically configured to store, in a secure manner, user-generated content. The user-generated content stored in the data stores 320 can be stored in any suitable form or format, typed in any suitable manner, in a relational or NoSQL database structure, and so on.

The foregoing embodiments depicted in FIG. 3 and the various alternatives thereof and variations thereto are presented, generally, for purposes of explanation, and to facilitate an understanding of various configurations and constructions of a dedicated database system and various modules and/or subservices thereof, such as described herein. However, it will be apparent to one skilled in the art that some of the specific details presented herein may not be required in order to practice a particular described embodiment, or an equivalent thereof.

For example, although various signal paths are illustrated as connected various functional services of the system 300, it may be appreciated these signal paths are merely examples; any block of the system 300 may be communicably couple-able to any other block thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
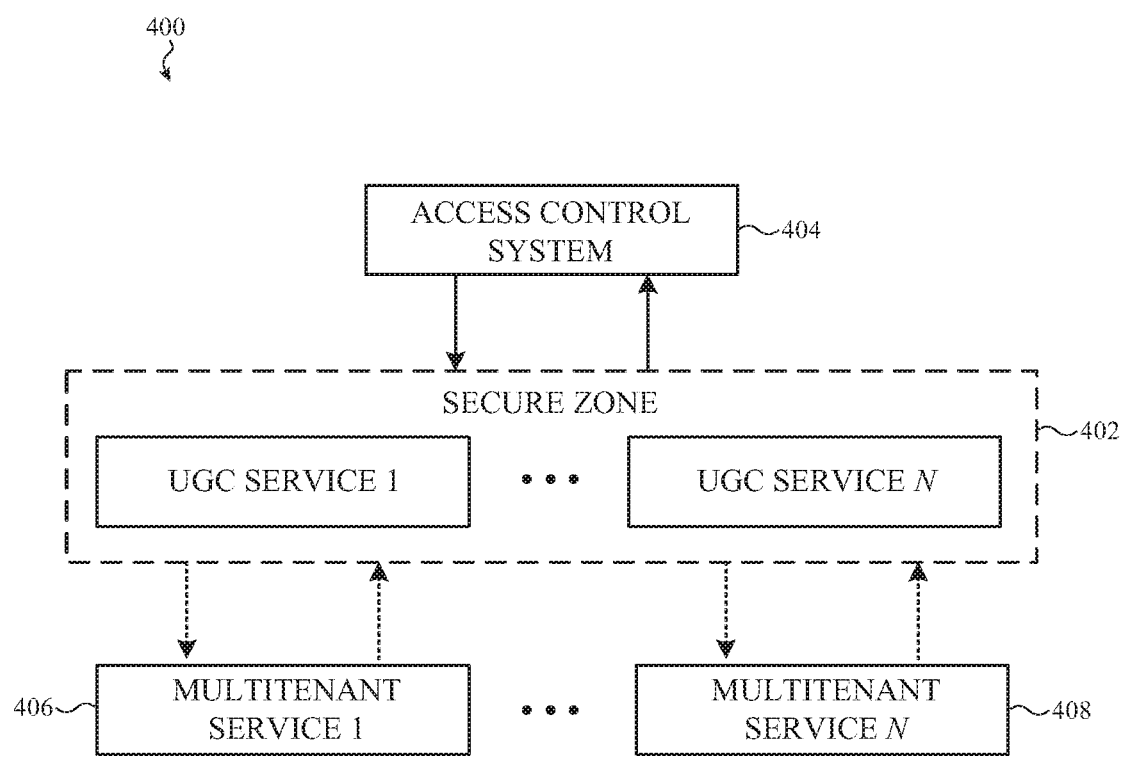
FIG. 4 depicts a simplified diagram illustrating a number of discrete secure zones defined by a dedicated database system each configured to compartmentalize particular user-generated content, such as described herein.

For example, in some embodiments, not all user-generated content may be handled in the same manner. FIG. 4 depicts a simplified diagram illustrating a number of discrete secure zones defined by a dedicated database system each configured to compartmentalize particular user-generated content, such as described herein.

More specifically, the system 400 depicts a secure zone 402 defined in part an access control system 404, such as described herein. In this example, however, the access control system 404 defines the secure zone 402 to encompass multiple different dedicated database systems, each of which may be associated with a particular multitenant service, such as the multitenant services 406, 408. In other examples, different dedicated database systems may be leveraged to provide different levels of security; certain user-generated content may be stored in dedicated database systems as described herein with a greater quantity of security controls than others. For example, date or other metadata information related to user-generated content may be stored in a faster-access dedicated database system than personal health information, which may be stored in a more secure database.

These foregoing embodiments depicted in FIGS. 1-4 and the various alternatives thereof and variations thereto are presented, generally, for purposes of explanation, and to facilitate an understanding of various configurations and constructions of a dedicated database system and an access control system, such as described herein. Such systems can be leveraged by multitenant services, licensed software services, or any other suitable combination thereof. Such services may be virtualized, monolithic, microservices, or any other suitable combination thereof. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
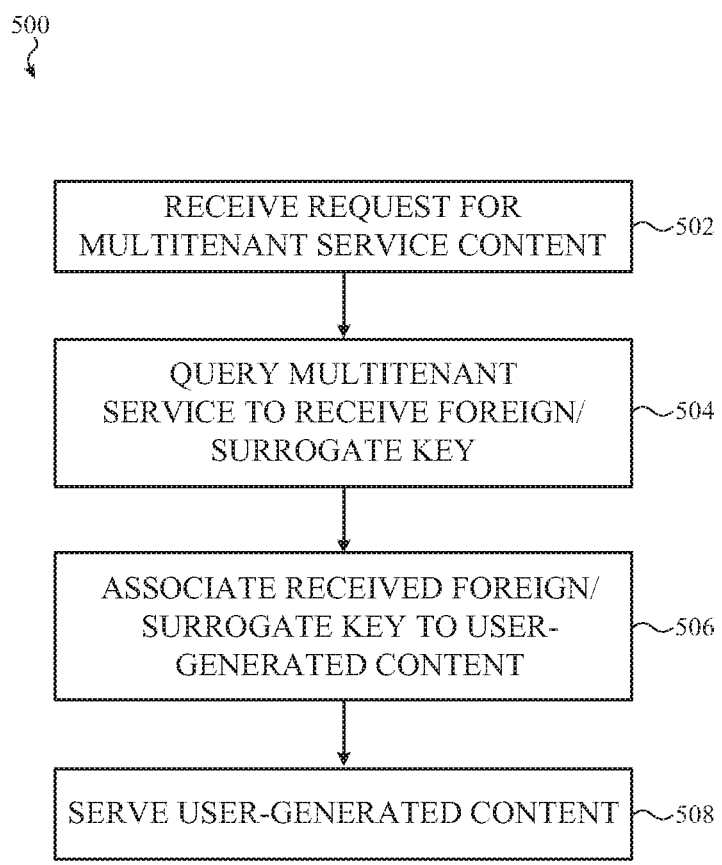
FIG. 5 is a flowchart depicting example operations of a method of serving user-generated content from a dedicated database system, such as described herein.
Figure 6:
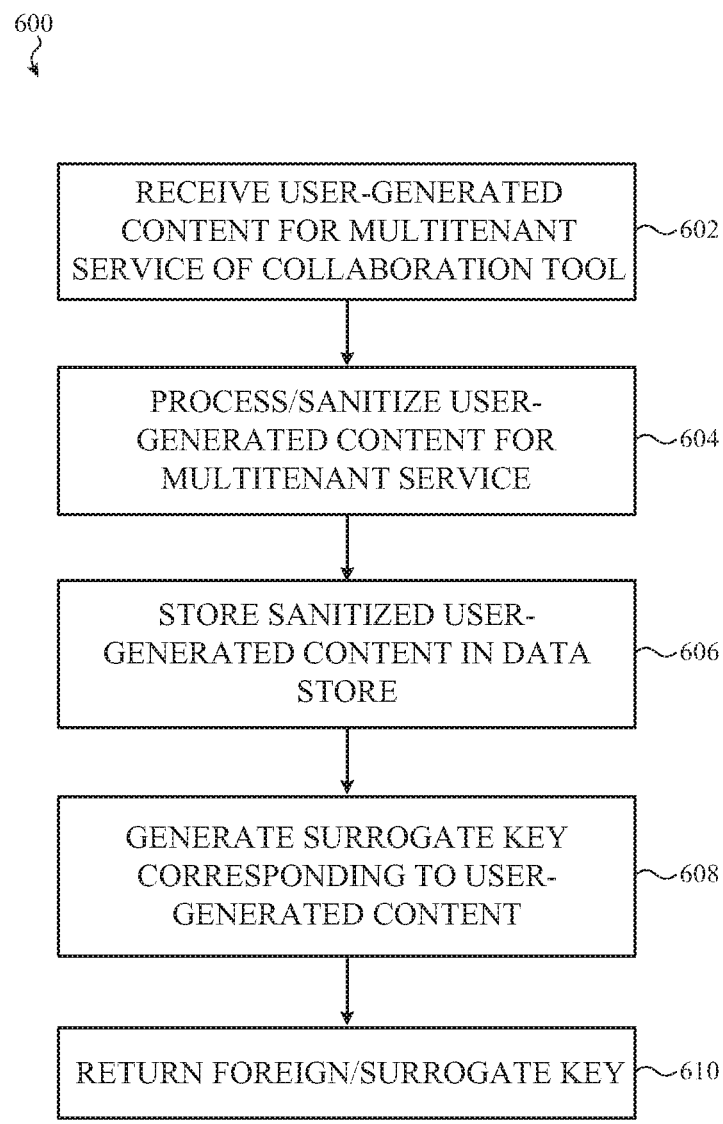
FIG. 6 is a flowchart depicting example operations of a method of inputting user-generated content to a dedicated database system, such as described herein.

For example, a system as described herein can be leveraged by various methods to perform one or more specific tasks or operations. FIGS. 5-6 present simplified signal flow diagrams of example methods that may be configured to leverage systems, or portions thereof, such as described herein.

FIG. 5 is a flowchart depicting example operations of a method of serving user-generated content from a dedicated database system, such as described herein. The method 500 can be performed in whole or in part by any suitable computing resource described herein. In many embodiments, however, the method 500 is performed at least in part by a gateway service and/or an access control system such as described herein.

The method 500 includes operation 502 in which a request for user-generated content related to a particular multitenant service is received. As with other embodiments described herein, such a request may take place over a communication channel established between a client application and an access control system, such as described herein. In many examples, the client application initiates an API request, the API request complying with an API exposed by the multitenant service to service requests for, among other things, user-generated content.

The method 500 includes operation 504, at which the method 500 queries the multitenant service and receives in response at least one foreign key or surrogate key. Thereafter at operation 506, the method 500 advances to receive the surrogate key at a dedicated database system or, more particularly, a catalog service of a dedicated database system in order to translate that surrogate key into corresponding user-generated content. Finally at operation 508, the method 500 advances to serve the user-generated content associated with the surrogate key.

FIG. 6 is a flowchart depicting example operations of a method of inputting user-generated content to a dedicated database system, such as described herein. As with the method 500, the method 600 can be performed in whole or in part by any suitable computing resource described herein. In many embodiments, however, the method 600 is performed at least in part by a gateway service and/or an access control system such as described herein.

The method 600 includes operation 602 in which user-generated content is received. The content is created or otherwise generated within an environment defined, at least in part, by a multitenant service or a collaboration service.

The method 600 advances to operation 604 at which the input(s) received are sanitized or otherwise prepared for storage in a database of a dedicated database system, such as described herein. The method 600 next advances to operation 606 at which the sanitized input/user-generated content is stored in a data store.

Next, at operation 608 the method advances to generate a surrogate key to associate with the user-generated content. Finally, the created surrogate key can be returned/routed or otherwise communicated to the multitenant tool.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

For example, in some embodiments, one or more services may be configured with escalated privileges and may be permitted to access data stored in a user-generated content store. For example, an email notification service may be configured to generate email notifications to users of a software service. In some configurations, the email notification service may generate email notifications that preferably include content stored in the user-generated content store. Other example services that may be configured with escalated privileges can include notification services, subscription services, push services, and so on.

In addition, some embodiments can be configured with additional security measures. For example, in some constructions, all data associated with a particular tenant of a particular multitenant service can be tagged with an identifier unique to the tenant. In some examples, the identifier may be encrypted with a key unique to and/or owned by a particular tenant. As a result of these constructions, risks associated with incidental or unintended disclosure or serving of one tenant's information to another tenant can be eliminated. In further constructions, additional tags may be added that may encrypt or otherwise restrict access to user-generated data on a per-user, per-tenant, per-position, and so on.

In still further embodiments, a physical location of user-generated content can be configurable. For example, a tenant may be able to opt for that tenant's data to be stored in a particular selected jurisdiction or physical location. In some cases, a tenant may store its own data locally.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A database management system for a multitenant service, the database management system comprising:
   a host server comprising a processor executing an instance of an access control system configured to:
      receive a request for user-generated content from a client device, the request directed to the multitenant service;
      routing at least a portion of the request to the multitenant service;
      receiving, at the access control system and from the multitenant service, a surrogate key; and
      routing the surrogate key to a dedicated database system; and
   the dedicated database system for storing user-generated content, the dedicated database system configured to:
      receive the surrogate key from the access control system;

query a database, internal to the dedicated database system with the surrogate key, to retrieve the user-generated content associated with the surrogate key; and return a response to the access control system comprising the user-generated content; wherein:

in response to receiving the response from the dedicated database system, the access control system is configured to route the response to the client device that originated the request; and the client device is configured to display the user-generated content, or information derived therefrom, within a graphical user interface.

2. The database management system of claim 1, wherein:
the surrogate key comprises one of a universally-unique identifier or a globally-unique identifier; and
the surrogate key, prior to being stored by the multitenant service, is generated by one of the access control system or the dedicated database system.

3. The database management system of claim 1, wherein the dedicated database system comprises a catalog service configured to generate a query to the database for the user-generated content.

4. The database management system of claim 1, wherein:
the access control system defines a secure zone, encompassing the dedicated database system; and
user-generated content is only stored within the secure zone.

5. The database management system of claim 1, wherein:
the access control system defines a surrogate key zone, encompassing the multitenant service; and
user-generated content is not permitted to be stored within the surrogate key zone.

6. The database management system of claim 1, wherein the response complies with an application programming interface ("API") defined by the multitenant service.

7. The database management system of claim 6, wherein the request for user-generated content is initiated by a client application executing over the client device, the client application configured to communicate with the multitenant service via the API.

8. The database management system of claim 1, wherein the multitenant service is one of:
an issue tracking service;
a documentation service; or
a project management service.

9. An access control system for a database management system, the access control system comprising a processor configured to:
receive an API request for user-generated content from a client application, the API request directed to a collaboration service and the user-generated content created by a user in an environment defined by the collaboration service;
routing the API request to the collaboration service;
receiving, from the collaboration service, a surrogate key; and
routing the surrogate key to a dedicated database system configured to store the user-generated content;
receiving, from the dedicated database system, the user-generated content requested by the API request; and
returning an API response to the client application, the API response comprising the user-generated content, the user-generated content being displayed by the client application on a client device.

10. The access control system of claim 9, wherein the API response conforms to an API defined by the collaboration service.

11. The access control system of claim 9, wherein the dedicated database system is configured to store the user-generated content in a manner isolated from the collaboration service.

12. The access control system of claim 9, wherein the dedicated database system is communicably decoupled from the collaboration service.

13. The access control system of claim 9, further comprising:
a secure zone encompassing the dedicated database system across boundaries of which surrogate keys and user-generated content can pass; and
a surrogate key zone encompassing the collaboration service across boundaries of which only surrogate keys can pass.

14. A method of operating an access control system for a database management system, comprising:
receiving a first API request from a client application to store user-generated content for a multitenant software service;
routing the first API request to a dedicated database system configured to the user-generated content;
receiving, from the dedicated database system, a surrogate key; and
returning a second API request to the multitenant software service, the second API request configured to cause the multitenant software service to store the surrogate key in an internal database of the multitenant software service;
in response to a third API request for the user-generated content from a second client application, transmitting at least a portion of the third API request to the multitenant software service; and
receiving, from the multitenant software service, the surrogate key to access the user-generated content from the dedicated database system.

15. The method of claim 14, wherein the access control system comprises:
a secure zone encompassing the dedicated database system across boundaries of which surrogate keys and user-generated content can pass; and
a surrogate key zone encompassing the multitenant software service across boundaries of which only surrogate keys can pass.

16. The method of claim 14, wherein the first API request and the second API request conform to an API defined by the multitenant software service.

17. The method of claim 14, wherein the user-generated content is created in an environment defined by the multitenant software service.

18. The method of claim 14, wherein the user-generated content comprise multimedia content.

19. The method of claim 14, wherein the multitenant software service is one of:
an issue tracking service;
a project management service;
a code repository service; or
a documentation service.

20. The method of claim 14, wherein the dedicated database system is configured to store the user-generated content in a manner entirely isolated from the multitenant software service.

21. An access control system for a database management system, the access control system comprising a processor configured to:
   receive a first API request from a first client application to store user-generated content for a multitenant software service;
   route the first API request to a dedicated database system configured to store the user-generated content;
   receive, from the dedicated database system, a surrogate key;
   return a second API request to the multitenant software service, the second API request configured to cause the multitenant software service to store the surrogate key in an internal database thereof of the multitenant software service;
   in response to a third API request for the user-generated content from a second client application, transmit at least a portion of the third API request to the multitenant software service; and
   receive, from the multitenant software service, the surrogate key to access the user-generated content from the dedicated database system.

22. The access control system of claim 21, further comprising:
   a secure zone encompassing the dedicated database system across boundaries of which surrogate keys and user-generated content can pass; and
   a surrogate key zone encompassing the multitenant software service across boundaries of which only surrogate keys can pass.

23. The access control system of claim 21, wherein the first API request and the second API request conform to an API defined by the multitenant software service.

24. The access control system of claim 21, wherein the user-generated content is created in an environment defined by the multitenant software service.

25. The access control system of claim 21, wherein the user-generated content comprise multimedia content.

26. The access control system of claim 21, wherein the multitenant software service is one of:
   an issue tracking service;
   a project management service;
   a code repository service; or
   a documentation service.

27. The access control system of claim 21, wherein the dedicated database system is configured to store the user-generated content in a manner entirely isolated from the multitenant software service.

* * * * *